(12) United States Patent
Hu et al.

(10) Patent No.: US 9,836,880 B2
(45) Date of Patent: Dec. 5, 2017

(54) PATCH NET MODEL AND CONSTRUCTION METHOD THEREOF

(71) Applicant: TSINGHUA UNIVERSITY, Beijing (CN)

(72) Inventors: Shimin Hu, Beijing (CN); Fanglue Zhang, Beijing (CN); Miao Wang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 155 days.

(21) Appl. No.: 14/916,982

(22) PCT Filed: Dec. 25, 2013

(86) PCT No.: PCT/CN2013/090460
§ 371 (c)(1),
(2) Date: Mar. 4, 2016

(87) PCT Pub. No.: WO2015/032162
PCT Pub. Date: Mar. 12, 2015

(65) Prior Publication Data
US 2016/0196686 A1    Jul. 7, 2016

(30) Foreign Application Priority Data
Sep. 6, 2013 (CN) .......................... 2013 1 0403210

(51) Int. Cl.
*G06T 17/00* (2006.01)
*G06K 9/46* (2006.01)
(Continued)

(52) U.S. Cl.
CPC ........ *G06T 17/005* (2013.01); *G06F 17/3028* (2013.01); *G06F 17/30256* (2013.01);
(Continued)

(58) Field of Classification Search
CPC .................. G06T 11/60; G06T 17/005; G06T 2207/20156; G06T 7/162; G06F 17/30256; G06K 9/46
See application file for complete search history.

(56) References Cited

U.S. PATENT DOCUMENTS

2005/0212799 A1* 9/2005 Liao ........................ G06T 11/60
345/420

FOREIGN PATENT DOCUMENTS

CN     101425184 A     5/2009
CN     101944132 A     1/2011
(Continued)

OTHER PUBLICATIONS

International Search Report dated Jun. 23, 2014 from International Application No. PCT/CN2013/090460.

*Primary Examiner* — Kim Vu
*Assistant Examiner* — Michael Vanchy, Jr.
(74) *Attorney, Agent, or Firm* — McDermott, Will & Emery LLP

(57) ABSTRACT

The present invention relates to the technical field of image processing, and in particular, to a patch net model for image representation and a construction method of the patch net model. The patch net model for image representation is of a forest-shaped structure consisting of a plurality of composite nodes and basic nodes, each composite node is a non-leaf node, and each basic node is a leaf node; the basic node includes a certain patch region of an image and a representative patch representing an apparent feature of the patch region; the composite node includes a certain patch region of the image and can be further decomposed into basic nodes and/or composite nodes; an edge exists between two nodes, which are located on the same layer of the forest-shaped structure and are spatially connected, and a relation matrix
(Continued)

used for expressing the spatial relative position of the two nodes is arranged on the edge.

11 Claims, 1 Drawing Sheet

(51) Int. Cl.
    *G06F 17/30*     (2006.01)
    *G06T 11/60*     (2006.01)
    *G06T 7/162*     (2017.01)

(52) U.S. Cl.
    CPC ................ *G06K 9/46* (2013.01); *G06T 7/162* (2017.01); *G06T 11/60* (2013.01); *G06T 2207/20156* (2013.01)

(56) References Cited

FOREIGN PATENT DOCUMENTS

| | | | |
|---|---|---|---|
| CN | 102096816 | A | 6/2011 |
| CN | 102375990 | A | 3/2012 |
| CN | 102396222 | A | 3/2012 |
| CN | 102509327 | A | 6/2012 |
| CN | 102831613 | A | 12/2012 |
| CN | 102930246 | A | 2/2013 |

* cited by examiner

PATCH NET MODEL AND CONSTRUCTION METHOD THEREOF

TECHNICAL FIELD

The present invention relates to the technical field of image processing, and in particular, to a patch net model for image representation and a construction method of the patch net model.

BACKGROUND

In recent years, various image processing technologies have become a hot field in computer science research. Wherein, image synthesis and editing technology based on patches has become a powerful tool for users to edit multimedia contents.

In the prior art, an image editing method based on patches, typically, such as PatchMatch proposed by Barnes et al. in 2009, requires the users to provide semantic guidance or interaction to obtain meaningful results; moreover, in view of edition based on a plurality of images, the users need to search for new objects or regions to synthesize to specified positions; but these all require the users to have a good knowledge of art and master software expertly; meanwhile, in the case of more candidate images, the users need to spend a long time in boring work. The NRDC (non-rigid dense correspondence method) proposed by HaCohen et al. in 2011 can be applied to the above scenario, and it synthesizes an image by automatically searching for appropriate image patches; but the method has the deficiency that the processing speed is too low to meet the demands of real-time image editing, and particularly editing based on an image library. An appropriate image source can be found for the above scenario by adopting an image search method; but the image search method is generally based on global features, and thus cannot be used for finding appropriate optimal partial image regions for editing a local image.

In summary, the main difficulty of image editing based on patches in the image library on the basis of the existing image synthesis technology lies in that image patches used in the editing technology only describe local apparent features and do not describe image patch contents or the image itself, so that contents cannot be effectively organized and searched for in the image library, while the image search method using the global features lacks accurate positioning on local information.

SUMMARY

(1) Technical Problems to Be Solved

The purpose of the present invention is to provide a patch net model for image representation and a construction method of the patch net model, so that the patch net model can describe the local information of an image by using image patches, extract the structural information of the image and abstractly express the image, so as to meet the local image editing demand by using images in one image library.

(2) Technical Solution

The technical solution of the present invention is as follows:

A patch net model for image representation is provided, wherein the patch net model is of a forest-shaped structure consisting of a plurality of composite nodes and basic nodes, each composite node is a non-leaf node, and each basic node is a leaf node;

the basic node includes a certain patch region of an image and a representative patch representing an apparent feature of the patch region; the composite node includes a certain patch region of the image and can be further decomposed into basic nodes and/or composite nodes;

an edge exists between two nodes, which are located on the same layer of the forest-shaped structure and are spatially connected, and a relation matrix used for expressing the spatial relative position of the two nodes is arranged on the edge.

Preferably, the value of each element in the relation matrix is normalized to 0-1 for representing the probability of a pixel in one node connected with the edge being located at a specific relative position of the other node.

Preferably, the relation matrix is a 5*5 matrix.

The present invention further provides a method for constructing any above patch net model:

a patch net model construction method includes the following steps:

S1. selecting representative patches and image regions represented by the representative patches, and establishing basic nodes;

S2. combining the basic nodes with image region areas smaller than a preset value into a composite node according to a spatial connection relation;

S3. using the composite node and basic nodes with image region areas larger than the preset value as the first layer of the forest-shaped structure;

S4. decomposing the composite node into basic nodes and/or composite nodes until all leaf nodes are basic nodes;

S5. adding an edge between two nodes, which are located on the same layer of the forest-shaped structure and are spatially connected, and adding the relation matrix on the edge.

Preferably, the step S1 further includes:

S11. ordering all pixels in an image according to a gradient value;

S12. generating a representative patch at a position with the minimum gradient value within a region which is not represented by any representative patch;

S13. for any pixel not represented by any representative patch, judging whether an image patch with the pixel as the center can be represented by the representative patch generated in the step S12;

S14. repeating steps S12-S13 until all pixels in the image are represented by the representative patches.

Preferably, the method further includes the following step between the step S12 and the step S13:

moving the center of the representative patch to $X_{new}$ according to a formula $$X_{new} = \sum_{z \in P_x} g_z z \Big/ \sum_{z \in P_x} g_z;$$

wherein, z represents the pixel position in the representative patch $P_x$, and $g_z$ represents the gradient value at the z position. Preferably, the step S13 further includes:

for any pixel not represented by any representative patch, calculating the Euler distance between the image patch with the pixel as the center and the representative patch generated in the step S12 in a Lab color space;

the image patch with the calculated Euler distance not larger than a threshold is represented by the representative patch generated in the step S12.

Preferably, in the step S13, the threshold is σx, $$y = k\left(\frac{g(x)}{C(x,y)}\right)^a;$$

wherein, k is equal to 2, a is equal to 0.5, and C(x, y) represents the average color of the image patch.

Preferably, the preset value in the step S2 and the step S3 is 10% of the total area of the image. Preferably, in the step S5, the manner of calculating any element M (i, j) in the relation matrix is as follows:

for each pixel of one node connected with the edge, counting whether the pixels of the other node occur at the (i−2, j−2) position of the pixel, and if so, adding 1 to the count of M (i, j);

and finally normalizing each element in the obtained matrix to a (0, 1) interval by counting.

(3) Beneficial Effects

The patch net model based on patches provided by the embodiments of the present invention is of the forest-shaped structure consisting of a plurality of composite nodes and basic nodes, each composite node is the non-leaf node, and each basic node is the leaf node; the basic node includes the certain patch region of the image and the representative patch representing the apparent feature of the patch region; the composite node includes the certain patch region of the image and can be further decomposed into the basic nodes and/or the composite nodes; the edge exists between two nodes, which are located on the same layer of the forest-shaped structure and are spatially connected, and the relation matrix used for expressing the spatial relative position of the two nodes is arranged on the edge; by means of this forest-shaped structure, image contents in the image library are organized and expressed based on the patches in the present invention, so that the patch net model can describe the local information of the image by using the image patches, extract the structural information of the image and abstractly express the image, so as to search for and obtain local contents based on apparent features and meet the local image editing demand by using images in one image library.

DETAILED DESCRIPTION OF THE PREFERRED EMBODIMENTS

A further description of the specific implementations of the present invention will be given below in combination with the accompanying drawings and the embodiments. The following embodiments are merely used for illustrating the present invention, rather than limiting the scope of the present invention.

Figure 1:
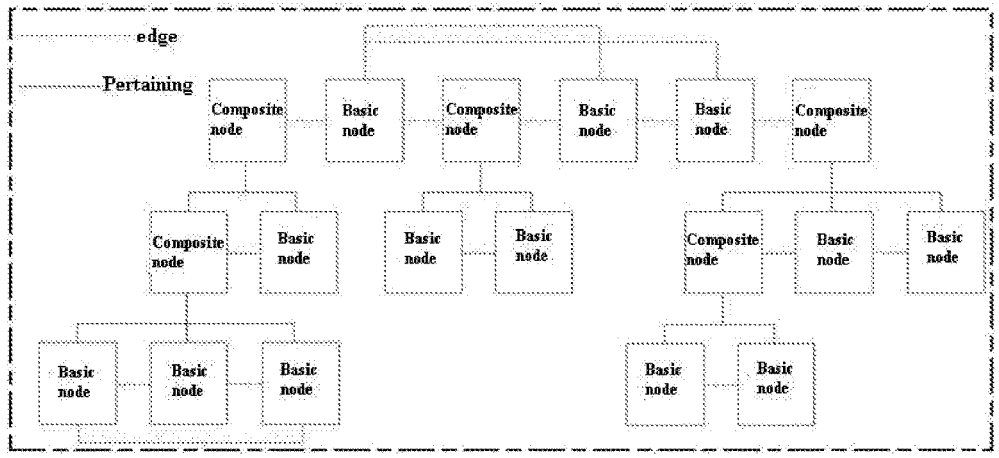
FIG. 1 is a schematic diagram of a structure of a patch net model in an embodiment of the present invention.

A patch net model for image representation is provided in the embodiment at first, as shown in FIG. 1, the patch net model is of a forest-shaped structure consisting of a plurality of composite nodes and basic nodes, each composite node is a non-leaf node, and each basic node is a leaf node;

according to the property that regions in an image have similar apparent features, the basic node includes a certain patch region of the image and a representative patch representing the apparent feature of the patch region; the composite node includes a certain patch region of the image and can be further decomposed into basic nodes and/or composite nodes to form a local tree-shaped structure; the composite nodes are used for expressing some image regions with complicated structural features;

an edge exists between two nodes, which are located on the same layer of the forest-shaped structure and are spatially connected, and a relation matrix used for expressing the spatial relative position of the two nodes is arranged on the edge, so as to abstractly express an image.

In the embodiment, the relation matrix can be a 5*5 matrix, the value of each element in the matrix is normalized to 0-1 for representing the probability of a pixel in one node connected with the edge being located at a specific relative position of the other node; for example, wherein the value at the (0, 0) position is the probability of the pixel contained in one node connected with the edge being located at the relative position (−2, −2) of the pixel contained in the other node connected with the edge; by means of this structure, image contents in an image library are organized and expressed based on patches, so that local contents can be searched for and obtained based on apparent features.

Figure 2:
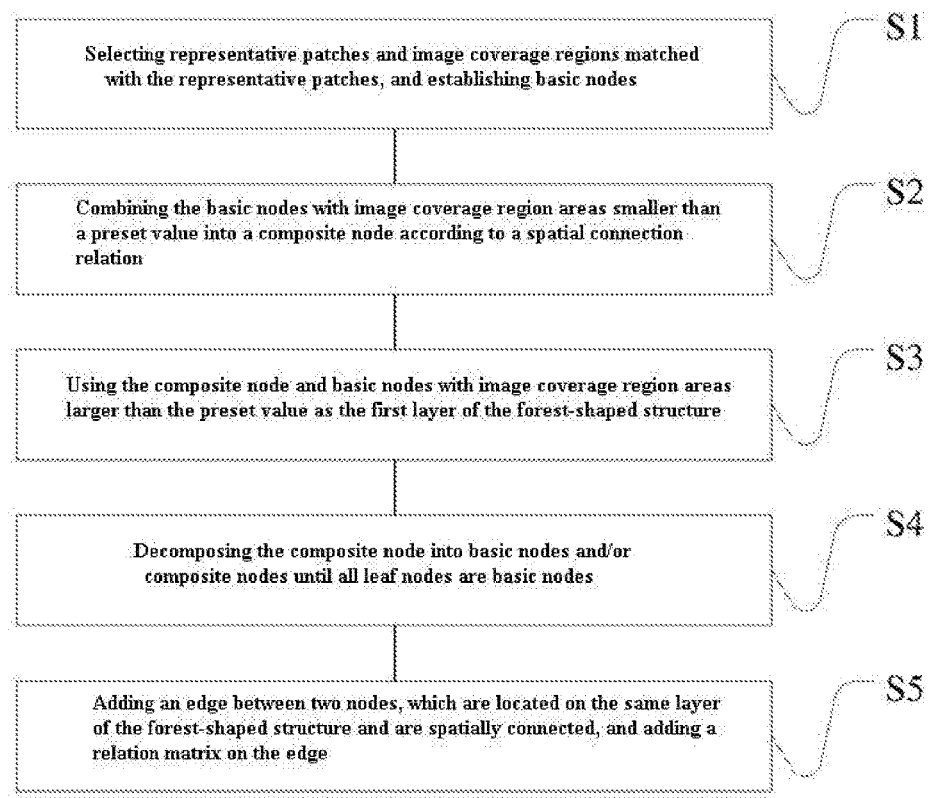
FIG. 2 is a schematic diagram of a flow of a patch net model construction method in an embodiment of the present invention.

The embodiment further provides a method for constructing the above patch net model; as shown in FIG. 2, the patch net model construction method mainly includes the following steps:

S1. selecting representative patches and image regions represented by the representative patches, and establishing basic nodes;

S2. combining the basic nodes with image region areas smaller than a preset value into a composite node according to a spatial connection relation;

S3. using the composite node and basic nodes with image region areas larger than the preset value as the first layer of the forest-shaped structure;

S4. decomposing the composite node into basic nodes and/or composite nodes until all leaf nodes are basic nodes;

S5. adding an edge between two nodes, which are located on the same layer of the forest-shaped structure and are spatially connected, and adding the relation matrix on the edge.

A detailed illustration of the above steps will be given below.

S1. selecting representative patches and image regions represented by the representative patches, and establishing basic nodes; in the embodiment, the step S1 further includes:

S11. ordering all pixels in an image according to a gradient value;

S12. generating a representative patch, for example, 13*13, at a position with the minimum gradient value (if a plurality of gradient values are the same, one is randomly selected) within a region which is not represented by any representative patch;

thereafter, moving the center of the representative patch to $X_{new}$ according to a formula $$X_{new} = \sum_{z \in P_x} g_z z \bigg/ \sum_{z \in P_x} g_z,$$

so that the representative patch can contain more possible proximal structural information; wherein, z represents the pixel position in the representative patch $P_x$, and $g_z$ represents the gradient value at the z position.

S13. for any pixel not represented by any representative patch, judging whether an image patch (for example, a 13*13 image patch) with the pixel as the center can be represented by the representative patch generated in the step S12;

preferably, the step S13 further includes:

for any pixel not represented by any representative patch, calculating the Euler distance between the image patch with the pixel as the center and the representative patch generated in the step S12 in a Lab color space; the image patch with the calculated Euler distance not larger than a threshold can be represented by the representative patch generated in the step S12;

to enable the representative patch to have better fault-tolerant ability in regions (for example, walls, leaves and the like) with complicated veins, so as to improve the abstract expression ability of the patch net model, in the embodiment, the following self-adapting threshold δx, y is used for judging whether a certain image patch can be represented by the representative patch; namely:

$$\delta x, y = k \left( \frac{g(x)}{C(x, y)} \right)^a ;$$

wherein, k is equal to 2, a is equal to 0.5, and C(x, y) represents the average color of the image patch. If the Euler distance of the image patch is larger than the above threshold, it is considered that the image patch cannot be represented by the representative patch generated in the step S12; otherwise, it is considered that the image patch can be represented by the representative patch generated in the step S12.

S14. repeating steps S12-S13 until all pixels in the image are represented by the representative patches. Finally, merging processing can be carried out according to the similarity relation of all representative patches and the represented image region positions; for example, if the represented image regions are overlapped for more than 30% and the distance of the representative patches is smaller than 500 (the Euler distance on the Lab color space), the image regions represented by two representative patches are merged, and the original representative patch with the maximum image region representation area is set as a new representative patch.

S2. combining the basic nodes with image region areas smaller than a preset value into a composite node according to a spatial connection relation; for example, the basic nodes with the image region areas smaller than 10% of the total area of the image are combined into the composite node according to the spatial connection relation, the composite node contains no representative patch, and the image region of the composite node is the sum of the image regions of the basic nodes contained in the composite node.

S3. using the composite node and basic nodes with image region areas larger than the preset value as the first layer of the forest-shaped structure; for example, the basic nodes with image region areas larger than 10% of the total area of the image and the composite node obtained in the step S2 are used as the nodes on the highest layer (the first layer) of the forest-shaped structure.

S4. decomposing the composite node into basic nodes and/or composite nodes until all leaf nodes are basic nodes; for example, for a certain composite node, all basic nodes (obtained by the coverage relation of the image regions) contained in the composite node are traversed at first, if a certain basic node has a connection relation with other nodes on the upper layer, the basic node is directly used as a sub-node pertaining to the composite node; the rest basic nodes having no spatial connection relation with the nodes on the upper layer are combined into a new composite node according to a spatial neighboring relation to serve as a sub-node pertaining to the original composite node, and recursion is carried out for expansion, until all leaf nodes are basic nodes.

S5. adding an edge (the edge does not exist between nodes on different layers) between two nodes, which are located on the same layer of the forest-shaped structure and are spatially connected, according to the adjacency relation of the image regions of the nodes, and adding the relation matrix on the edge. In the embodiment, the manner of calculating any element M (i, j) in the relation matrix is as follows: for example, the two nodes connected with one edge are respectively a node A and a node B, the matrix representing the relative position relation can be a 5*5 relation matrix M; for each pixel in the node A, counting whether the pixels contained in the node B occur at the (i−2, j−2) position of the pixel; if so, adding 1 to the count of M (i, j); and finally normalizing all elements in the M to a (0, 1) interval to obtain the final relation matrix by counting, and thus the patch net model is constructed.

The above implementations are merely used for illustrating the present invention, rather than limiting the present invention. Those of ordinary skill in the art can make various changes and variations without departing from the spirit and scope of the present invention. Accordingly, all equivalent technical solutions belong to the protection scope of the present invention.

The invention claimed is:

1. A method for constructing a patch net model for image representation, wherein the patch net model is of a forest-shaped structure consisting of a plurality of composite nodes and basic nodes, each composite node is a non-leaf node, and each basic node is a leaf node;

the basic node comprises a certain patch region of an image and a representative patch representing an apparent feature of the patch region; the composite node comprises a certain patch region of the image and can be further decomposed into basic nodes and/or composite nodes;

an edge exists between two nodes, which are located on the same layer of the forest-shaped structure and are spatially connected, and a relation matrix used for expressing the spatial relative position of the two nodes is arranged on the edge, wherein the method comprises:

S1. selecting representative patches and image regions represented by the representative patches, and establishing basic nodes;

S2. combining the basic nodes with image region areas smaller than a preset value into a composite node according to a spatial connection relation;

S3. using the composite node and basic nodes with image region areas larger than the preset value as the first layer of the forest-shaped structure;

S4. decomposing the composite node into basic nodes and/or composite nodes until all leaf nodes are basic nodes; and S5. adding an edge between two nodes, which are located on the same layer of the forest-shaped structure and are spatially connected, and adding the relation matrix on the edge.

2. The method for constructing the patch net model of claim 1, wherein the value of each element in the relation matrix is normalized to 0-1 for representing the probability of a pixel in one node connected with the edge being located at a specific relative position of the other node.

3. The method for constructing the patch net model of claim 2, wherein the relation matrix is a 5*5 matrix.

4. The method for constructing the patch net model of claim 1, wherein the relation matrix is a 5*5 matrix.

5. The method for constructing the patch net model of claim 1, wherein the step S1 further comprises:
   S11. ordering all pixels in an image according to a gradient value;
   S12. generating a representative patch at a position with the minimum gradient value within a region which is not represented by any representative patch;
   S13. for any pixel not represented by any representative patch, judging whether an image patch with the pixel as the center can be represented by the representative patch generated in the step S12;
   S14. repeating steps S12-S13 until all pixels in the image are represented by the representative patches.

6. The method for constructing the patch net model of claim 5, wherein the method further comprises the following step between the step S12 and the step S13:
   moving the center of the representative patch to $X_{new}$ according to a formula $$X_{new} = \sum_{z \in P_x} g_z z \bigg/ \sum_{z \in P_x} g_z;$$

wherein, z represents the pixel position in the representative patch $P_x$, and $g_z$ represents the gradient value at the z position.

7. The method for constructing the patch net model of claim 6, wherein the step S13 further comprises:
   for any pixel not represented by any representative patch, calculating the Euler distance between the image patch with the pixel as the center and the representative patch generated in the step S12 in a Lab color space;
   the image patch with the calculated Euler distance not larger than a threshold is represented by the representative patch generated in the step S12.

8. The method for constructing the patch net model of claim 5, wherein the step S13 further comprises:
   for any pixel not represented by any representative patch, calculating the Euler distance between the image patch with the pixel as the center and the representative patch generated in the step S12 in a Lab color space;
   the image patch with the calculated Euler distance not larger than a threshold is represented by the representative patch generated in the step S12.

9. The method for constructing the patch net model of claim 8, wherein in the step S13, the threshold is σx, $$y = k\left(\frac{g(x)}{C(x, y)}\right)^a;$$

wherein, k is equal to 2, a is equal to 0.5, and C(x, y) represents the average color of the image patch.

10. The method for constructing the patch net model of claim 1, wherein the preset value in the step S2 and the step S3 is 10% of the total area of the image.

11. The method for constructing the patch net model of claim 1, wherein in the step S5, the manner of calculating any element M (i, j) in the relation matrix is as follows:
   for each pixel of one node connected with the edge, counting whether the pixels of the other node occur at the (i−2, j−2) position of the pixel, and if so, adding 1 to the count of M (i, j);
   and finally normalizing each element in the obtained matrix to a (0, 1) interval by counting.

* * * * *